US012711933B2

(12) United States Patent
Yamaguchi

(10) Patent No.: US 12,711,933 B2
(45) Date of Patent: Aug. 18, 2026

(54) KEY FOR KEYBOARD DEVICE

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 1002 days.

(21) Appl. No.: 17/949,960

(22) Filed: Sep. 21, 2022

(65) Prior Publication Data

US 2023/0098045 A1 Mar. 30, 2023

(30) Foreign Application Priority Data

Sep. 30, 2021 (JP) ................................ 2021-161117

(51) Int. Cl.
*G10H 1/34* (2006.01)

(52) U.S. Cl.
CPC ....... *G10H 1/344* (2013.01); *G10H 2220/091* (2013.01); *G10H 2220/265* (2013.01)

(58) Field of Classification Search
CPC ............. G10H 1/344; G10H 2220/091; G10H 2220/265
USPC ........................................................... 84/644
See application file for complete search history.

(56) References Cited

U.S. PATENT DOCUMENTS

2008/0210079 A1* 9/2008 Osuga ...................... G10C 3/12
84/423 R

FOREIGN PATENT DOCUMENTS

JP 2003-271126 A 9/2003
JP 2018112763 A * 7/2018

* cited by examiner

*Primary Examiner* — Jeffrey Donels
*Assistant Examiner* — Philip G Scoles
(74) *Attorney, Agent, or Firm* — Womble Bond Dickinson (US) LLP

(57) ABSTRACT

A key for a keyboard device includes a resin key body and one or a plurality of woody boards attached along at least part of a side surface of the key body. The key body includes an upper convex part which extends along an upper end of the side surface and is formed continuous with on upper surface of the key body such that it protrudes in a lateral direction of the key body, and a lower supporting protrusion which is disposed in the vicinity of a central portion or a lower end of the side surface such that it protrudes in a lateral direction of the key body and is opposed to the upper convex part. The woody board is sandwiched by the upper convex part and the lower supporting protrusion.

7 Claims, 10 Drawing Sheets

KEY FOR KEYBOARD DEVICE

CROSS-REFERENCE TO RELATED APPLICATIONS

This application claims priority to Japanese Patent Application Number 2021-161117, filed on Sep. 30, 2021, the entire content of which is incorporated herein by reference.

BACKGROUND OF THE INVENTION

Field of the Invention

The present invention relates to a key for a keyboard device which is applied to a keyboard instrument, such as an electronic piano, and more particularly to a key for a keyboard device, which has a woody board attached to a side surface thereof.

Description of the Related Art

Conventionally, there has been known a key for a keyboard device, which has a woody board attached to a side surface of a key body made of resin so as to impart a woody feeling to the key at a low cost. For example, in Japanese Laid-Open Patent Publication (Kokai) No. 2003-271126, a key structure is disclosed which is comprised of a key base body made of resin, in which an upper portion, a lower portion, and a connecting portion connecting the upper and lower portions, are integrally formed with each other, and an intermediate member, which is provided between the upper and lower portions of the key base body and is formed of a material other than that of the key base body, the intermediate member being formed of a wood-based material having a rigidity equal to or higher than that of the key base body.

In the key structure disclosed in Japanese Laid-Open Patent Publication (Kokai) No. 2003-271126, a recess formed by the upper portion, the lower portion, and the connecting portion of the key base body is formed along almost the entire length of the key base body in a front-rear direction. Since the key structure is configured such that woody material is fitted in the recess without substantially any gap, if the woody board is expanded due to the influence of moisture or the like, there is a fear of occurrence of deformation, such as warpage or distortion, of the key. Further, in a case where the woody material is bonded to the recess with an adhesive, since gap between the recess and the woody materials is so small that there is no space to receive extra adhesive, and therefore part of the adhesive sometimes leaks out of the recess via the gap and sticks and solidifies. This can spoil the appearance of the key or in some cases cause interference with an adjacent key to cause trouble in player's performance.

Further, to avoid these problems, if woody material slightly smaller in size than the above-described recess is used, there is formed a gap between the recess and the woody material. This spoils the appearance of the key.

SUMMARY OF THE INVENTION

It is an object of the present invention to provide a key for a keyboard device, which is capable of preventing the appearance of the key from being spoiled by a gap between a key body and a woody board, preventing the key from being deformed even when the woody board is expanded, and preventing, when the woody board is bonded to the key body, extra adhesive, which may leak out, from causing interference with an adjacent key and causing degradation of excellent appearance.

To attain the above object, the present invention provides a key for a keyboard device, including a key body made of resin, which has at least an upper surface and a side surface and extends a predetermined length in a front-rear direction, and at least one or a plurality of woody boards attached along at least part of the side surface of the key body, wherein the key body includes an upper convex part extending along an upper end of the side surface and formed continuous with the upper surface, the upper convex part protruding in a lateral direction of the key body, and a lower supporting protrusion disposed in the vicinity of a central portion or a lower end of the side surface, the lower supporting protrusion protruding in the lateral direction of the key body and opposed to the upper convex part, wherein the woody board is sandwiched by the upper convex part and the lower supporting protrusion.

With this construction, the woody board is supported by the upper convex part formed along the upper end of the side surface of the key body, and the lower supporting protrusion formed in the vicinity of the central portion or the lower end of the side surface such that the woody board is vertically sandwiched between the upper convex part and the lower supporting protrusion, so that no gap is formed between the key body and the woody board in the vicinity of the upper end of the side surface of the key, where it is easy to visually recognize during depression of an adjacent key, which prevents the appearance of the key from being spoiled.

Further, on an upper side of the woody board, the whole upper end of the woody board is in contact with the upper convex part formed along the upper end of the side surface of the key body and is supported by the same without substantially any gap therebetween, but on a lower side of the woody board, only part of the lower end of the woody board is supported by the lower supporting protrusion. Therefore, even when the woody board is expanded due to the influence of moisture or the like, since sufficient space is secured below the woody board, there is no fear that the key body is deformed by concentration of stress on the key body. Further, when the woody board is expanded, the lower supporting protrusion presses the woody board against the upper convex part while biting into the woody board, and hence it is also possible to prevent formation of a gap between the upper convex part and the woody board.

Furthermore, when the key body and the woody board are bonded with an adhesive, extra adhesive can flow out into space below the woody board. Since there is no fear that the adhesive having leaked out below the woody board interferes with the adjacent key, and also during depression of the adjacent key, portions below the woody board are not exposed outside, it is also possible to prevent the appearance from being spoiled by the adhesive having leaked out.

Preferably, the key body further includes a front convex part extending along a front end of the side surface and protruding in the lateral direction of the key body, and a rear supporting protrusion disposed in the vicinity of the central portion or a rear end of the side surface, the rear supporting protrusion protruding in the lateral direction of the key body and opposed to the front convex part, and the woody board is sandwiched by the front convex part and the rear supporting protrusion.

With the construction of this preferred embodiment, the woody board is not only vertically sandwiched by the upper convex part and the lower supporting protrusion but also is supported by the front convex part formed along the front end of the side surface of the key body and the rear supporting protrusion formed in the vicinity of the central port on or the rear end of the side surface, such that the woody board is sandwiched therebetween in the front-rear direction, and therefore no gap is formed between the key body and the woody board also in the vicinity of the front end of the side surface of the key, where it is easy to visually recognize during depression of the adjacent key, whereby it is possible to further prevent the appearance of the key from being spoiled. Further, when the woody board is expanded, the rear supporting protrusion presses the woody board against the front convex part while biting into the woody board, and hence it is also possible to prevent formation or a gap between the front convex part and the woody board.

Preferably, the key body includes a plurality of the lower supporting protrusions.

With the construction of this preferred embodiment, the plurality of lower supporting protrusions are formed in the vicinity of the central portion or the lower end of the side surface of the key body, whereby it is possible to more stably support the lower end of the woody board. Therefore, it is possible to more effectively prevent a gap from being formed between the key body and the woody board in the vicinity of the upper end of the side surface of the key. Further, also when the woody board is expanded, since the plurality of lower supporting protrusions can more stably press, the woody board against the upper convex part while biting into the woody board, it is possible not only to more effectively prevent deformation of the woody board but also to more effectively prevent a gap from being formed between the upper convex part and the woody board.

Preferably, the upper convex part has a surface opposed to the lower supporting protrusion, the surface being sloped downward toward the lower end of the side surface such that the surface protrudes downward as the surface extends toward a tip end of the upper convex part, and the lower supporting protrusion has a surface opposed to the upper convex part, the surface being sloped upward toward the upper end of the side surface such that the surface protrudes upward as the surface extends toward a tip end of the lower supporting protrusion.

With the construction of this preferred embodiment, the surface of the upper convex part, which is opposed to the lower supporting protrusion, is sloped toward the lower end of the side surface such that the surface protrudes downward as it extends toward the tip end of the upper convex part (toward a side remote from the side surface of the key body), and the surface of the lower supporting protrusion, which is opposed to the upper convex part, is sloped toward the upper end of the side surface such that the surface protrudes upward as it extends toward the tip end of the lower supporting protrusion (toward the side remote from the side surface of the key body). With this, when the woody board is expanded, the woody board is guided by the above sloped surfaces, and is expanded such that it slides into a base end side (side closer to the side surface of the key body) of the upper convex part or the lower supporting protrusion, and hence the key body and the woody board are brought into more intimate contact with each other to make a gap difficult to be formed therebetween, and it is possible to prevent the appearance of the key from being spoiled deformation of the woody board.

More preferably, the front convex part has a surface opposed to the rear supporting protrusion, the surface being sloped toward the rear end of the side surface such that the surface protrudes rearward as the surface extends toward a tip end of the front convex part, and the rear supporting protrusion has a surface opposed to the front convex part, the surface being sloped toward the front end of the side surface such that the surface protrudes forward as the surface extends toward a tip end of the rear supporting protrusion.

With the construction of this preferred embodiment, the surface opposed of the front convex part, which is opposed to the rear supporting protrusion, is sloped toward the rear end c f the side surface such that the surface protrudes rearward as it extends toward the tip end of the front convex part (toward the side remote from the side surface of the key body), and the surface of the rear supporting protrusion, which is opposed to the front convex part, is sloped toward the front end of the side surface such that the surface protrudes forward as it extends toward the tip end of the rear supporting protrusion (toward the side remote from the side surface of the key body). With this, when the woody board is expanded, the woody board is guided by the above sloped surfaces, and is expanded such that it slides into a base end side (side closer to the side surface of the key body) of the front convex part or the rear supporting protrusion, and hence the key body and the woody board are brought into more intimate contact with each other to make a gap difficult to be formed therebetween, and it is possible to prevent the appearance of the key from being spoiled by deformation of the woody board.

Preferably, the key body is made for a white key and includes a large width portion extending a predetermined length in the front-rear direction and adjacent only to a white key, and a small width portion extending a predetermined length in the front-rear direction and adjacent to a black key, and a groove for receiving a front end of the woody board is formed in a corner part formed at a boundary between the large width portion and the small width portion.

With the construction of this preferred embodiment, the key body includes the large width portion adjacent only to a white key, and the small width portion adjacent to a black key, and the front end of the woody board is received by the groove in the corner part formed at the boundary between the large width portion and the small width portion. Therefore, it is possible to improve adhesiveness of the key body and the woody board on the boundary between the large width portion and the small width portion, whereby it is possible to prevent a gap from being formed between the woody board and the key body.

Preferably, the woody board is a soft wood material with a specific gravity of 0.5 or less.

With the construction of this preferred embodiment, the woody board is a soft wood material with the specific gravity of 0.5 or less, and when the woody board is expanded, it is possible for the lower supporting protrusion or the rear supporting protrusion to easily bite into the woody board. With this, since the woody board can be more stably pressed against the upper convex part, it is possible not only to more effectively prevent deformation of the woody board but also to more effectively prevent a gap from being formed between the upper convex part and the woody board.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at the left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism there for, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 9A and 9B are side view of the key body and the woody boards of the white key, in which FIG. 9A shows the white key in a state where the woody boards are attached to the key body, and FIG. 9B shows the white key in a state where the woody boards are removed from the key body;

DETAILED DESCRIPTION OF PREFERRED EMBODIMENTS

Figure 1A:
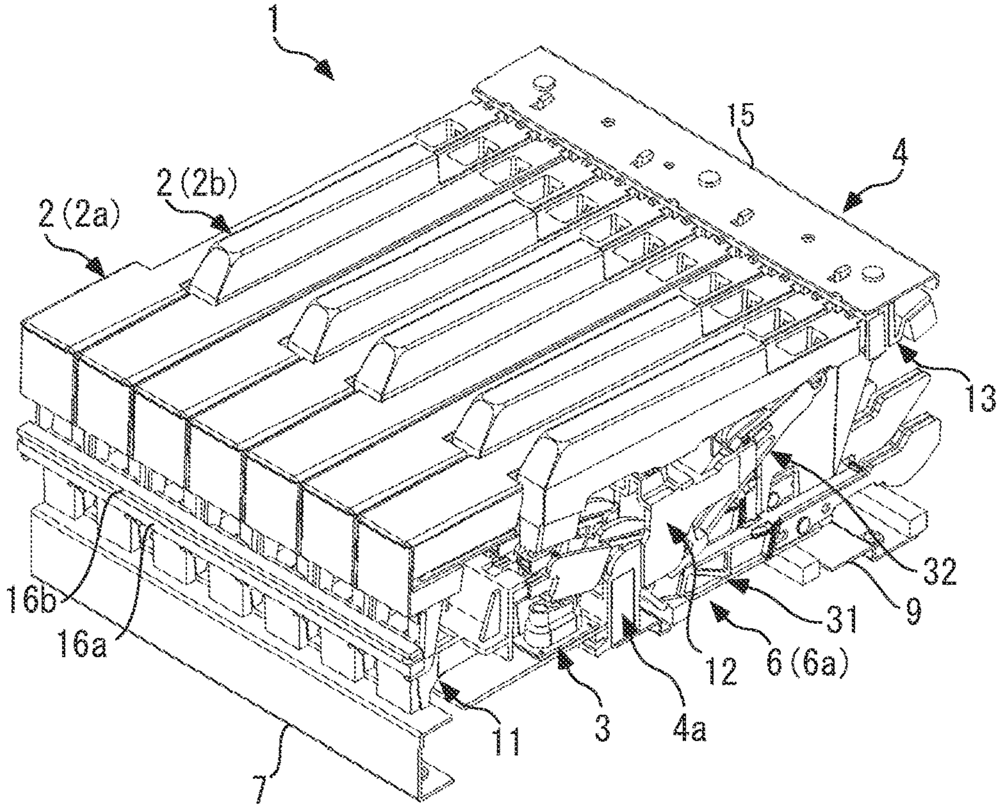

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic arrangement of the keyboard device 1 and operation thereof, and then of an essential part of the present invention.

Figure 1B:
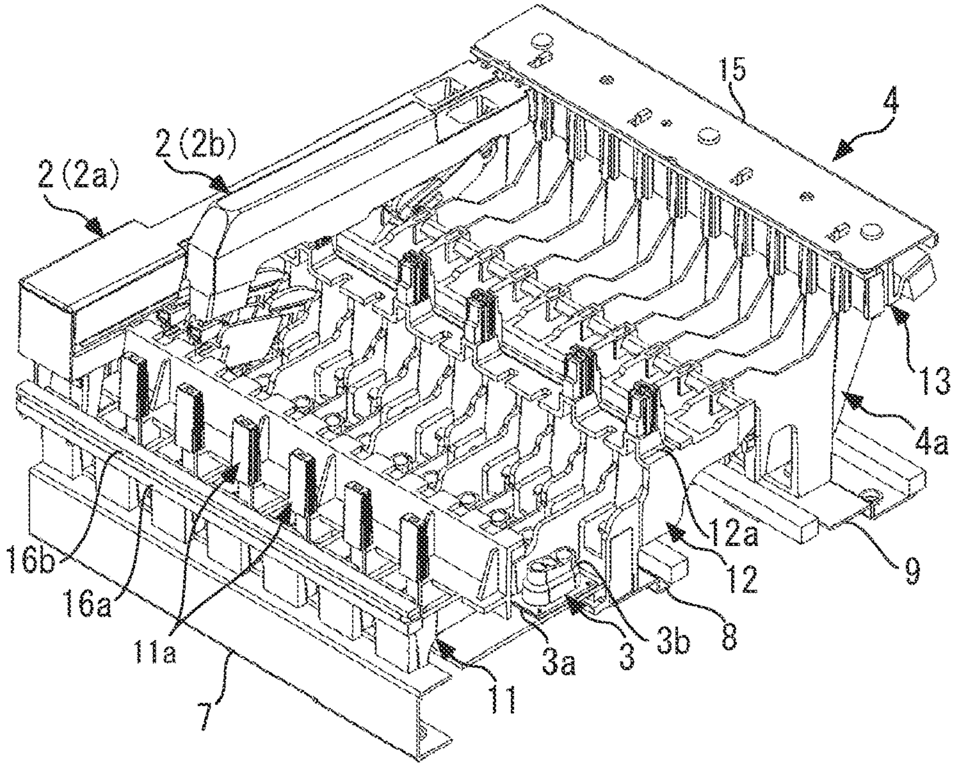
Figure 2:
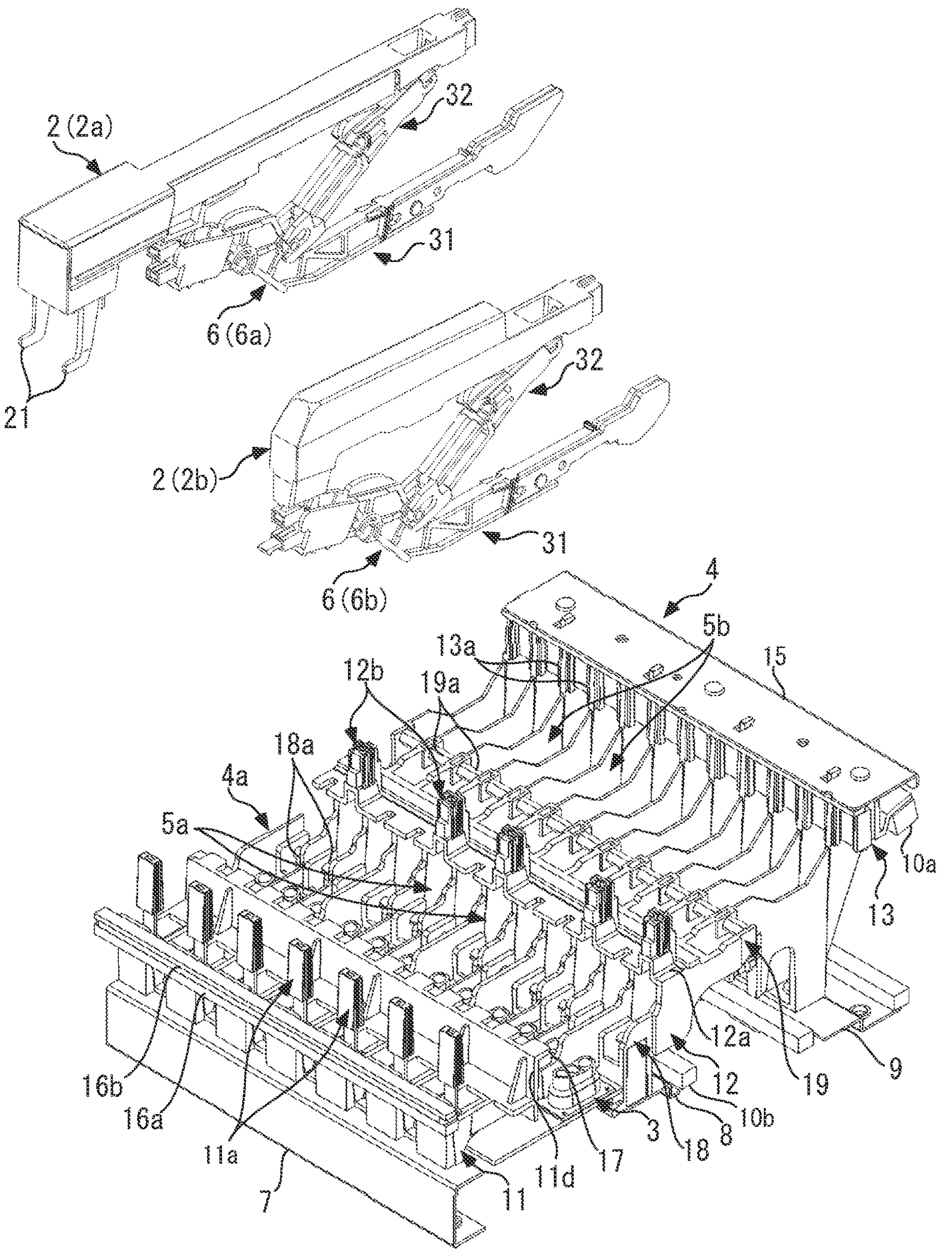
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted FIG. 2 shows a state the keyboard device 1 shown in FIG. 1B in which the white key 2*a* and the black key 2*b* are removed together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged in a state arranged side by side in a left-right direction, the plurality of key support mechanisms 6 each pivotally mounted on the keyboard chassis 4 for supporting an associated one of the keys 2 from below, and key switches 3 each for detecting key depression information of an associated one of the keys 2.

Figure 3A:
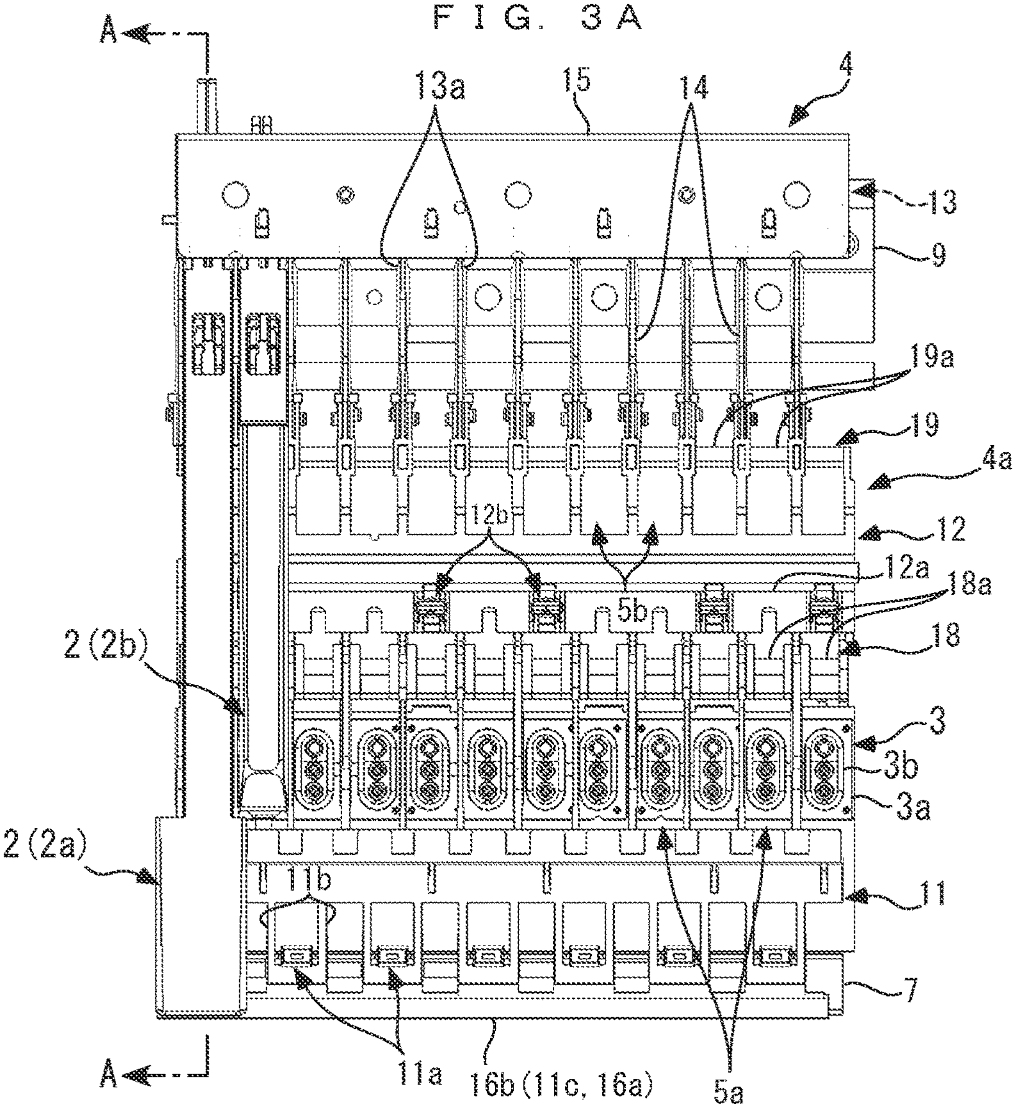
FIG. 3A is a plan view of the keyboard device shown in FIG. 1B
Figure 3B:
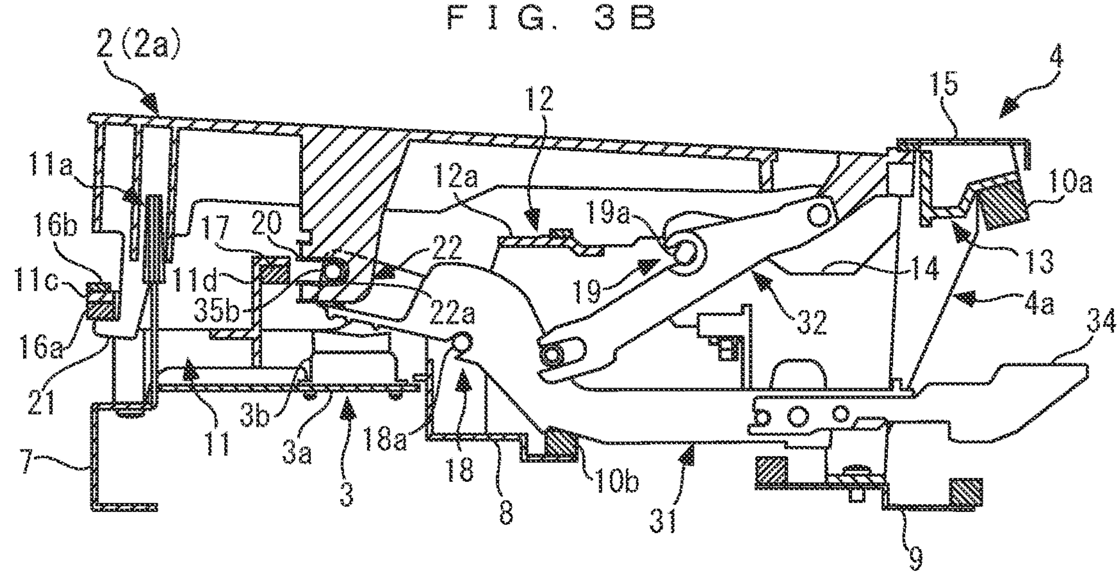
FIG. 3B is a cross-sectional view taken along line A-A of FIG. 3A.

The keyboard chassis 4 includes a chassis body 4*a* formed as a resin molded article which is made e by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other by a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front. 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direct on, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion lie in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and nigher than the first pivot shafts 18*a*, and the second arms 32 are swingably supported on associated ones of the second pivot shafts 19*a*. Note that a first arm lower limit stopper 10*b* extending along, the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other so as to be arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
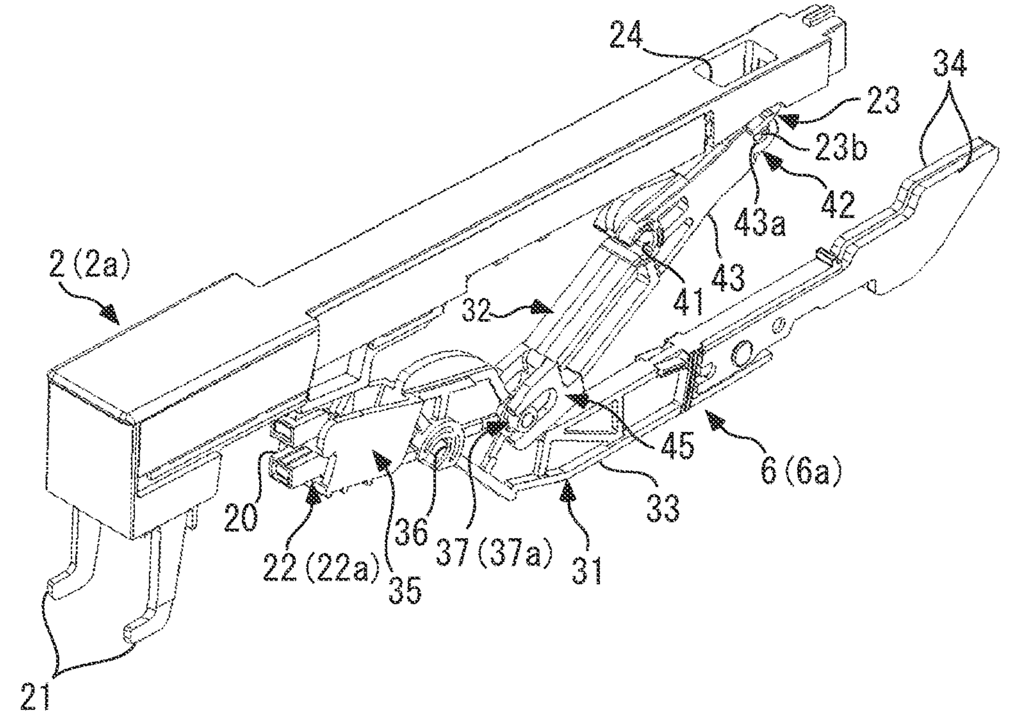
Figure 4B:
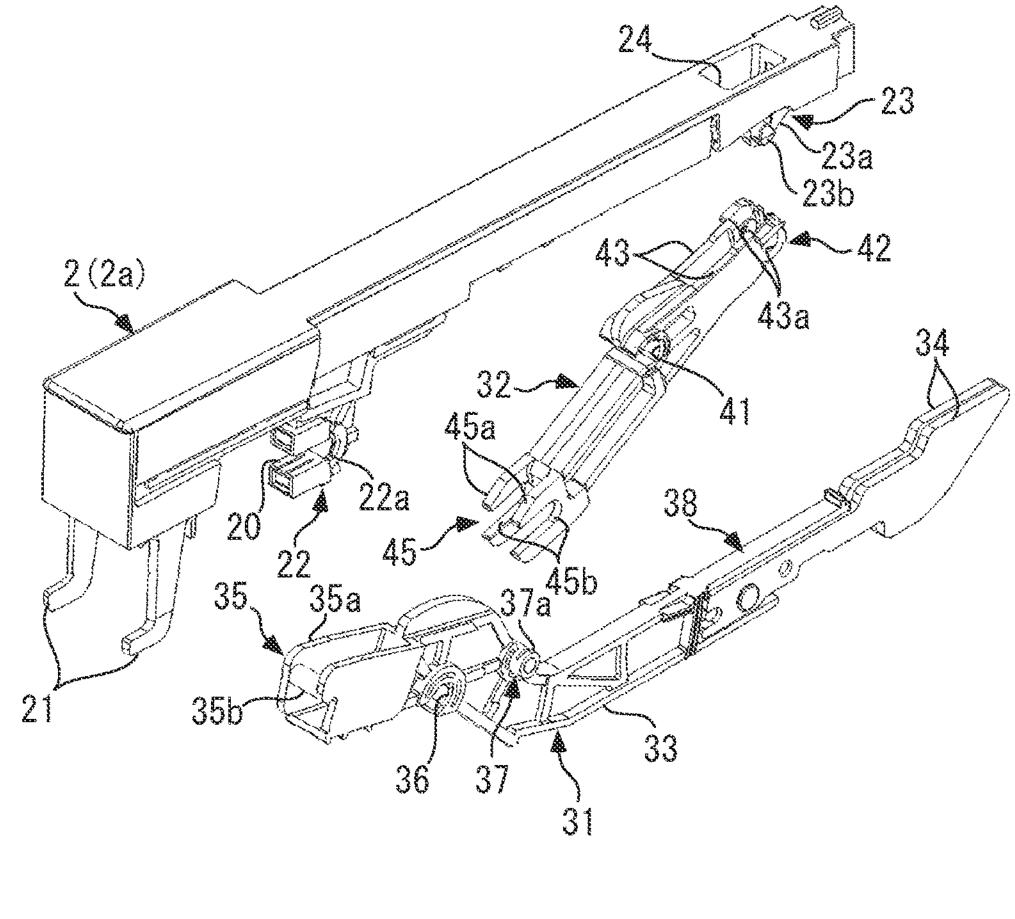

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess 22*a* which has a U shape having a slot-like shape in side view and open forward. Further, the connecting recess 22*a* has a key side noise suppressing member 20 attached thereto, which is formed to cover the whole inner peripheral surface of the connecting recess 22*a*, for suppressing generation of noise when a connecting shaft 35*b*, referred to hereinafter, of the first arm 31 slides in the connecting recess 22*a*.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, a rear portion of the white key 2*a* is formed with a tool insertion hole 24 which vertically extends through the rear portion, and is used to insert a predetermined tool from above for disconnect no the white key 2*a* from the second arm 32 of the key support mechanism 6*a* e.g. for maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting port on 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
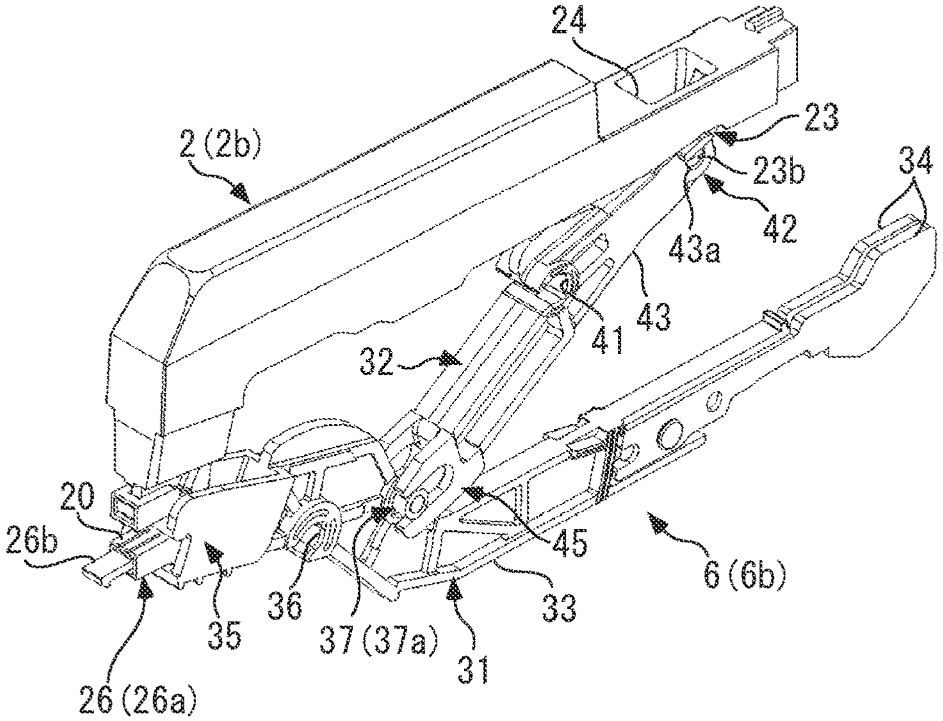
Figure 5B:
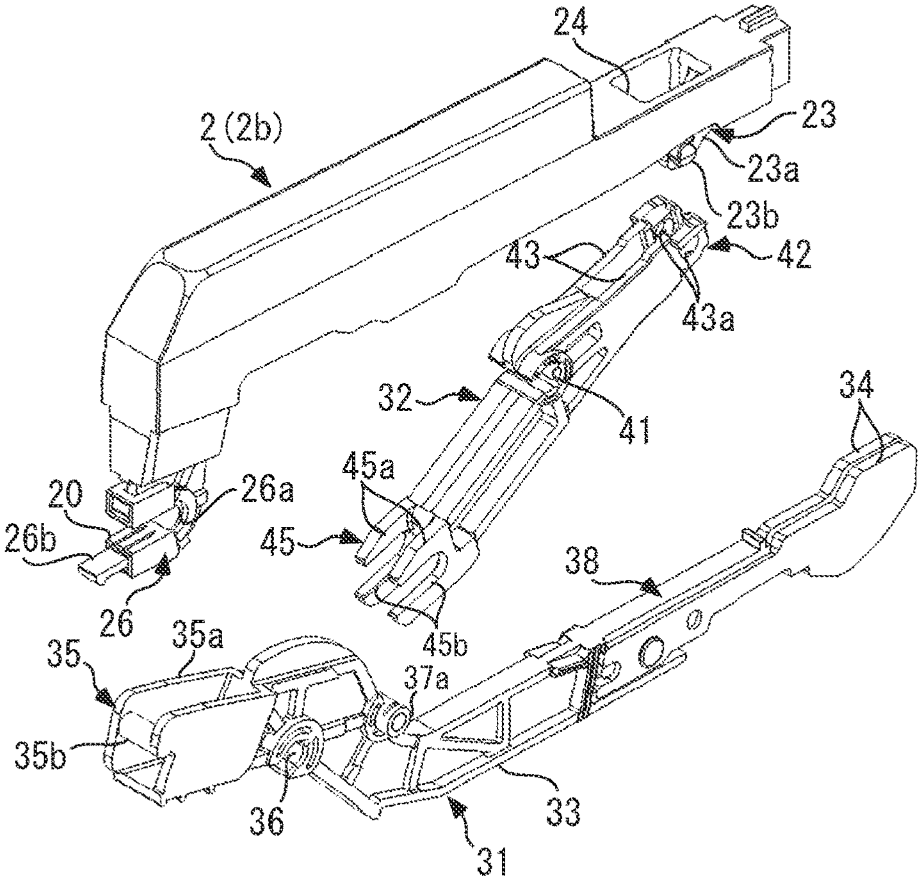

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* which has a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that two left and right weights 34 and 34 of the black key-associated key support mechanism 6*b* differ from the weights 34 of the white key-associated key support mechanism 6*a* in the shape of the rear portion thereof.

Figure 6A:
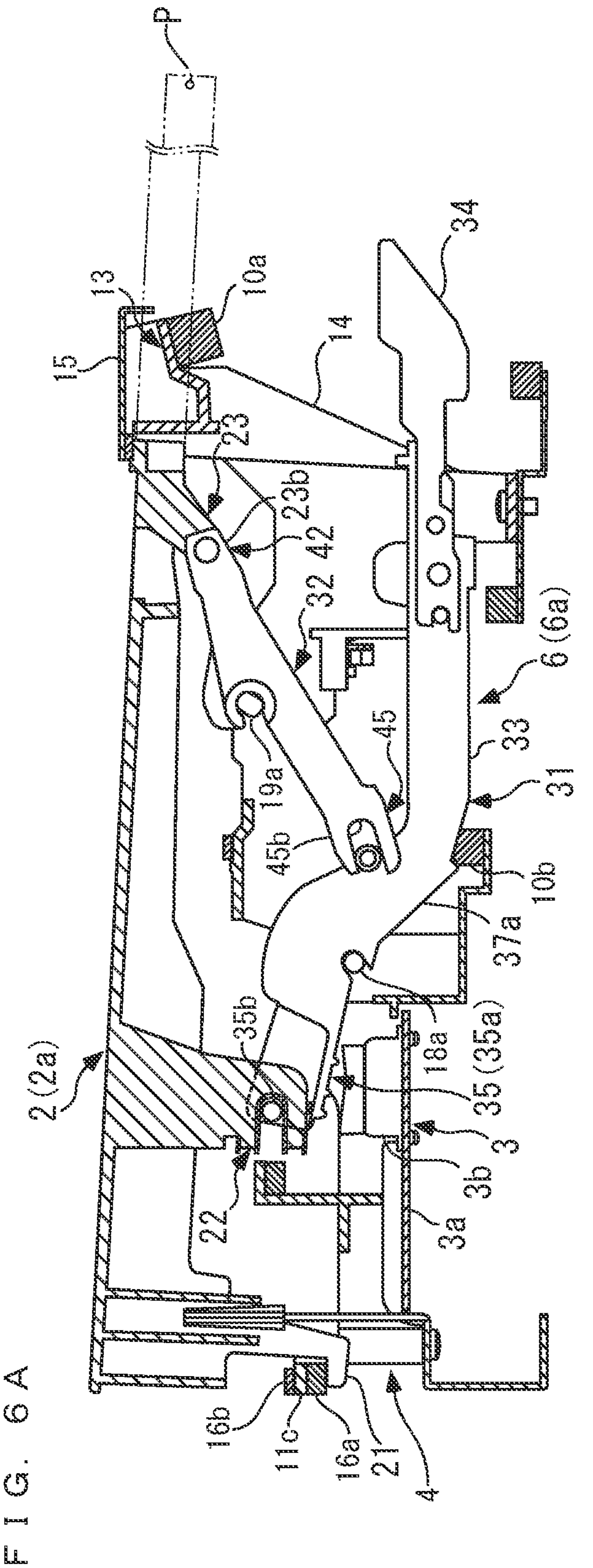
Figure 6B:
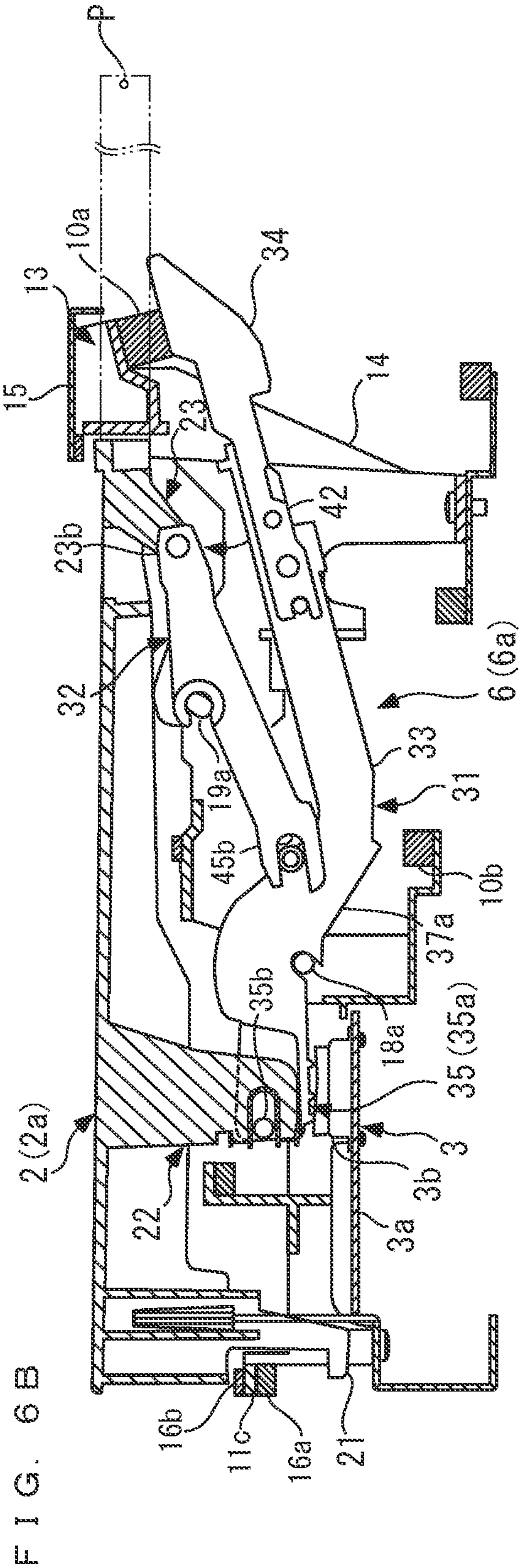
Figure 7A:
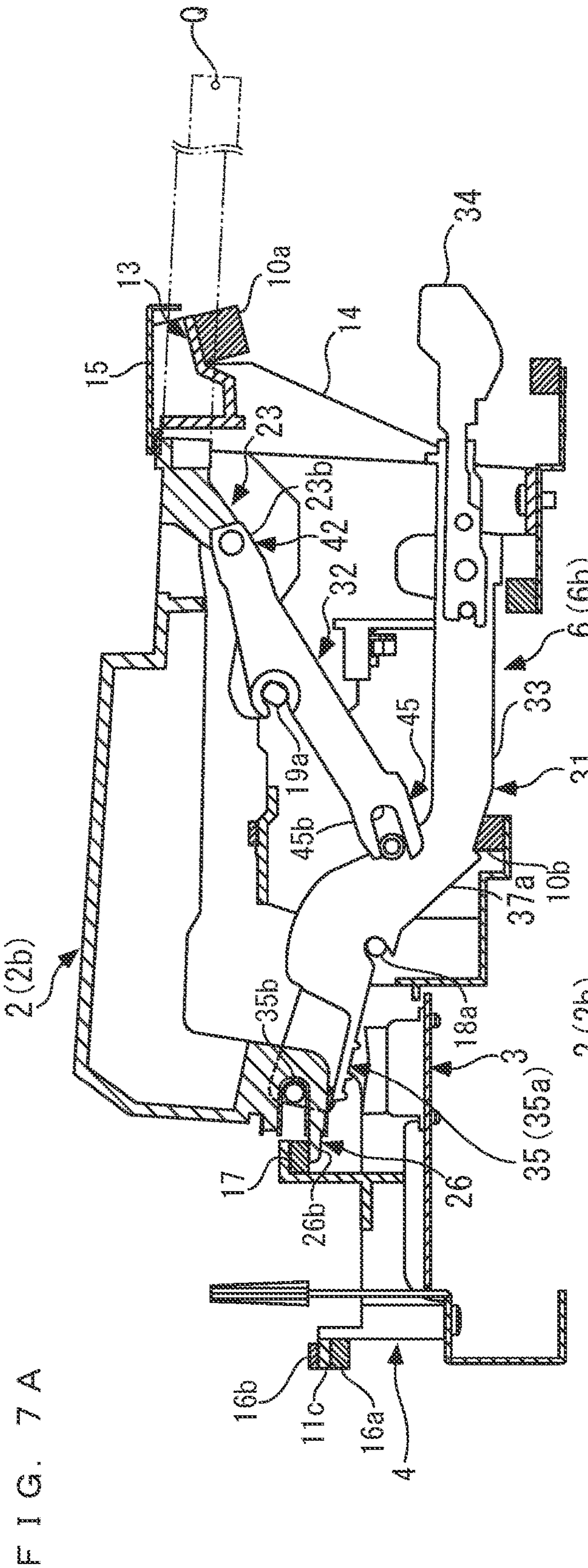
Figure 7B:
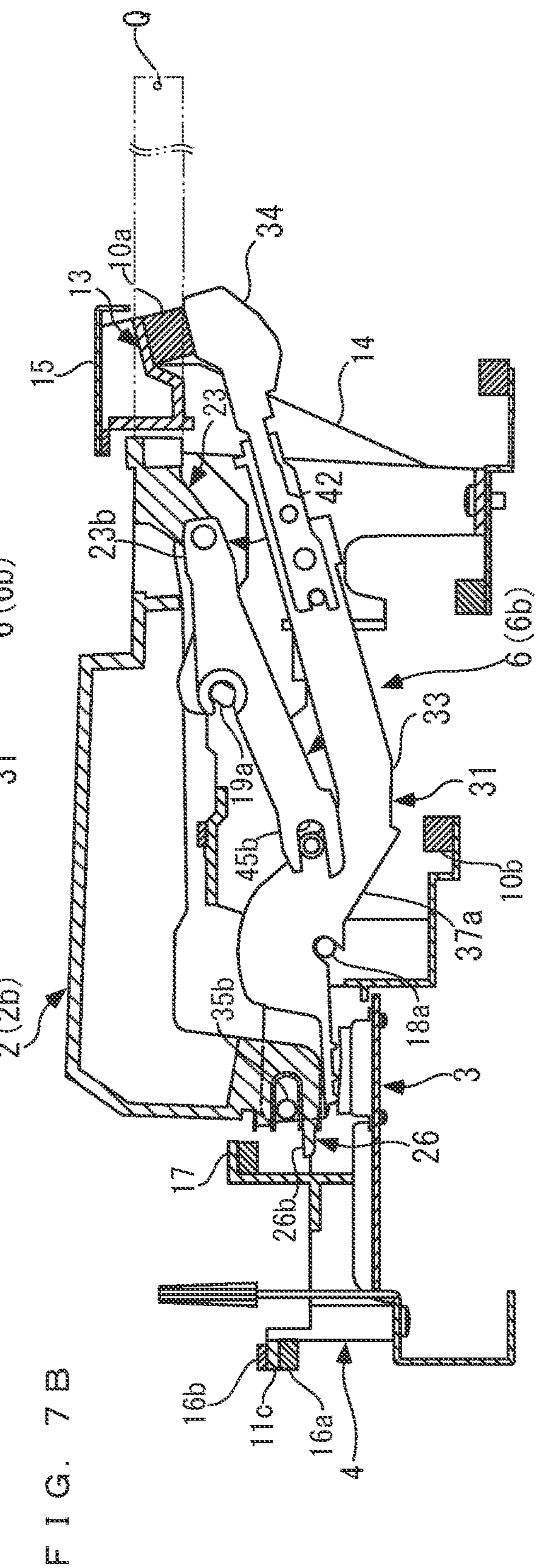

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* moves downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, moves upward. With this, the second arm 32 is pivotally moved in a clockwise direction about the second pivot shaft 19*a* Then, in accordance with this pivotal movement of the second arm 32, the key rear-side connecting portion 23, which connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting tort-on 35 moves downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is tilted such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* becomes approximately twice as long as the length of the white key 2*a* itself, for example. With this, when the front end of the white key 2*a* is depressed to the lowest position, compared with the case where the white key 2*a* is in the key-released state shown in FIG. 5A, the front end of the white key 2*a* is located lower by a predetermined key stroke (e.g. 10 mm) and the rear end of the white key 2*a* is located lower by a distance (e.g. 5 mm), which is approximately half of the above key stroke.

On the other hand, when the finger is released from the white key 2*a* being depressed, the first arm 31 of the key support mechanism 6*a* pivotaly moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower stopper 10*b* from above, and both of the upper limit position regulation portions 21 and 21 of the white key 2*a* move into contact with the key upper limit stopper 16*a* from below, whereby further pivotal movement of the white key 2*a* is blocked, and the white key 2*a* returns to its original key-released state.

Further, operation in response to depression of the black key 2*b* is performed similar to the above-described operations of the white key 2*a* and the key support mechanism. 6*a* in response to depression of the white key 2*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* operates such that it pivotally moves about a virtual pivot Q located rearward of the rear end thereof. Note that similar to the above-mentioned virtual pivot P of the white key 2*a*, the location of the virtual pivot Q is set such that a distance from the front end of the black key 2*b* becomes approximately twice as long as the length of the black key 2*b* itself, for example. Therefore, the front end of the black key 2*b* is depressed to its lowest position, compared with a case where the black key 2*b* is in the key-released state shown in FIG. 7A, the front end of the black key 2*b* is located lower by a predetermined key stroke and the rear end thereof is located lower by a distance which is approximately half of the above key stroke.

On the other hand, when the finger is released from the black key 2*b* having been depressed, the first arm 31 and the second arm 32 of the key support mechanism 6*b* pivotally move in a direction opposite to the above-mentioned direction, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIGS. 6 to 11. The essential part of the present invention is a woody board attachment structure in which woody boards are attached to side surfaces of a key of the keyboard device. Although in the present embodiment, a description will be given of an example in which the woody board attachment structure is applied to a white key, the same attachment structure may be applied to a black key.

Figure 8:
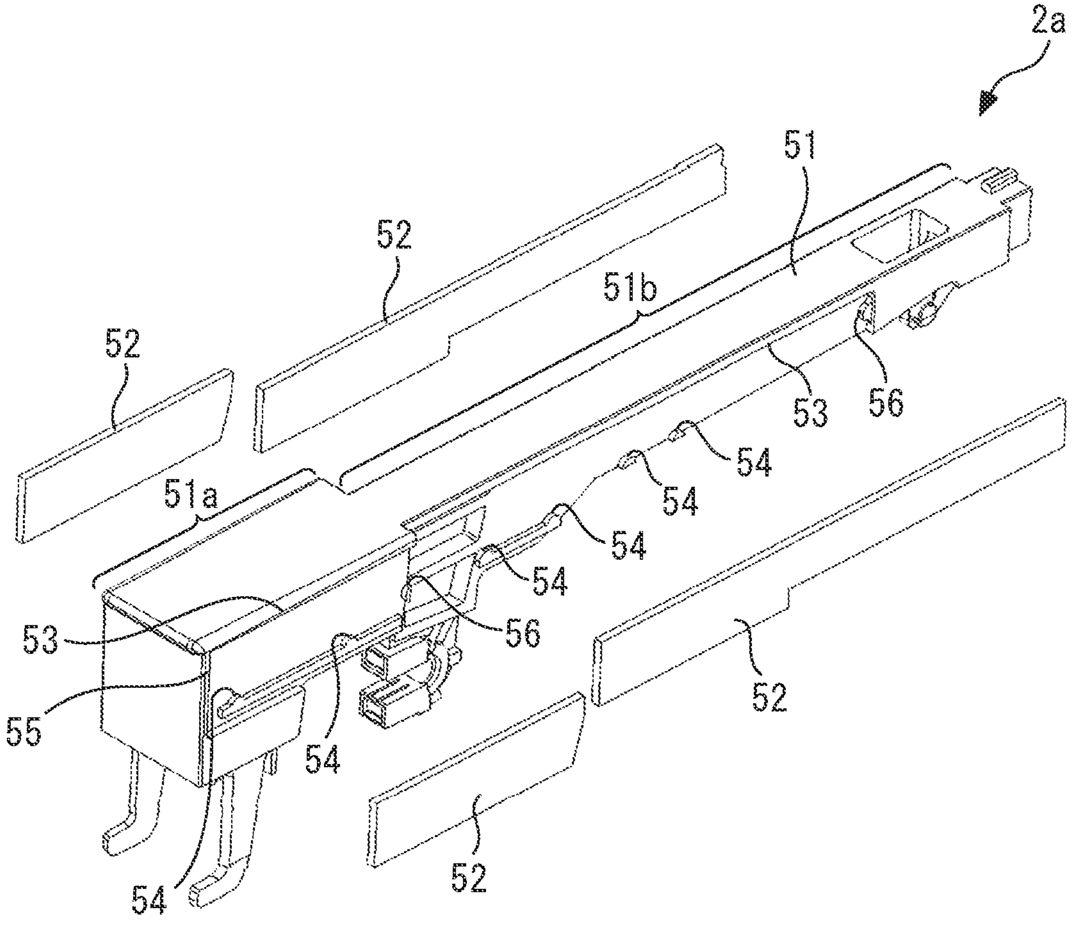
FIG. 8 is a perspective view of a key body itself of the white key and woody boards attached to side surfaces of the key body.

FIG. 8 shows the key body itself of the white key and the woody boards attached to side surfaces of the key body. As described hereinabove, a key body 51 of the white key 2*a* is formed by injection molding of a predetermined resin material (e.g. an AS resin). The white key 2*a* of the present embodiment is e.g. an A key (key for the tone of 1*a*), and the key body 51 of the white key 2*a* is comprised of a large width portion 51*a* adjacent to another white key 2*a*, and a small width portion 51*b* adjacent to one of the black keys 2*b*. Woody boards 52 are attached to heft and right side surfaces of the respective larges width portion 51*a* and small width portion 51*b*. Woody materials, including not only wood materials but also wood-grain decorative boards, plywood boards, medium density fiberboards (MDF), and so forth, can be used for the woody boards 52. In the present embodiment, a soft wood material with a specific gravity of 0.5 or less is, used for the woody boards 52. Examples of such wood materials include spruce and predetermined tropical wood. Note that although the thickness of the woody boards 52 can be selected from a variety of thicknesses according to design, in the present embodiment, the thickness thereof set to approximately 2 mm by taking into consideration the balance of the strength of the woody boards 52, the ease of attaching the woody boards 52 to the key body 51, manufacturing costs, and so forth.

Figure 9A:
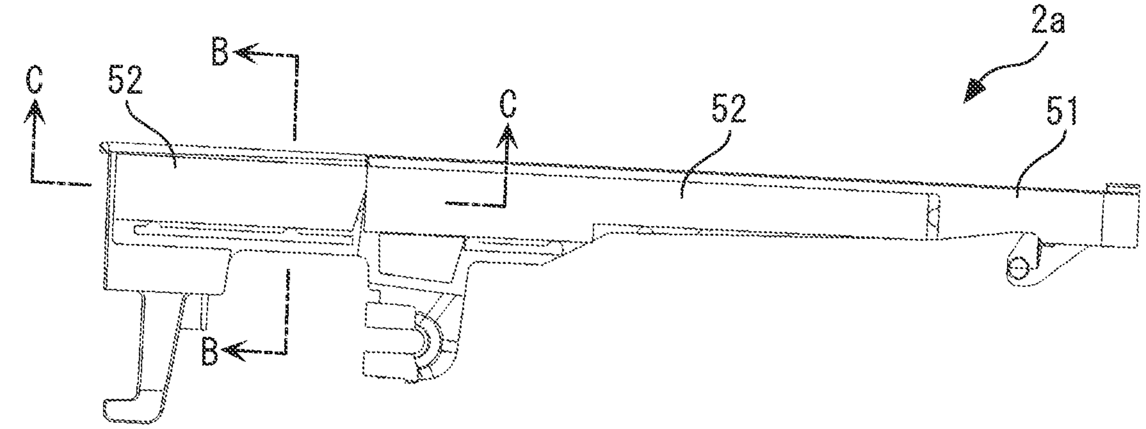
Figure 9B:
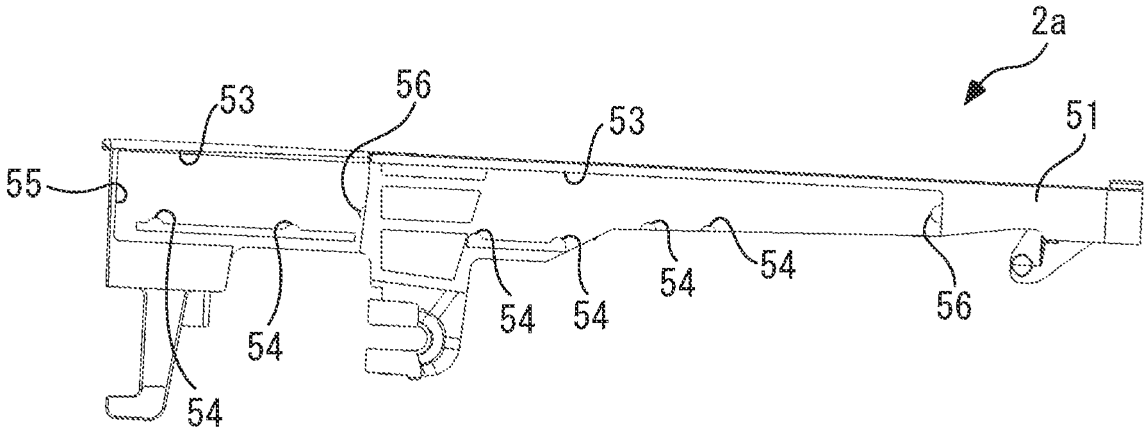

FIG. 9A is a view of the white key 2*a* in a state where the woody boards 52 are attached thereto, as viewed from one side thereof, and FIG. 9B shows the key body 51 in a state where the woody boards 52 are removed therefrom. An upper end of each side of the key body 51 is formed with upper convex parts 53 protruding in a lateral direction of the key body 51. In the present embodiment, the upper convex parts 53 are provided on the large width portion 51*a* and the small width portion 51*b*, respectively. The upper convex parts 53 are formed continuous with an upper surface of the key body 51, and extend along an upper end of the key body 51. The upper convex parts 53 restrict the positions of upper ends of the woody boards 52 attached to the key body 51. That 1*s*, the upper ends of the woody boards 52 are attached to the upper convex parts 53 such that they are brought into contact the upper convex parts 53 without substantially any gap therebetween.

Figure 10A:
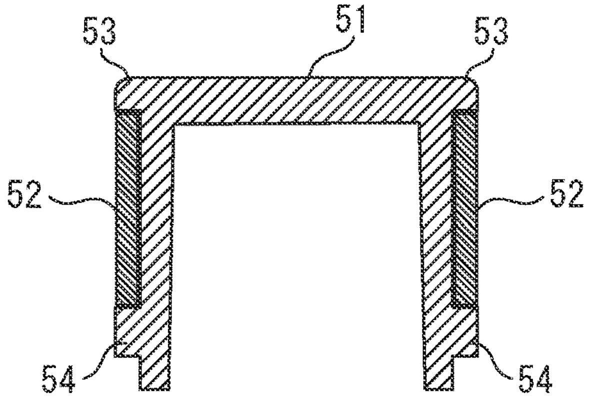
FIG. 10A is a cross-sectional view taken along line B-B of FIG. 9A, and FIG. 10B in shows a variation of a portion shown in FIG. 10A.

On the key body 51, in the vicinity of a central portion of each side surface of the large width portion 51*a*, and in the vicinity of a lower end of each side surface of the small width portion 51*b*, there are formed a plurality of lower supporting protrusions 54 which protrude in the lateral direction of the key body 51 and are opposed to the upper convex parts 53. The lower supporting protrusions 54 restrict the positions of lower ends of the woody boards 52 attached to the key body 51. That is, the lower ends of the woody boards 52 are partially supported by the lower supporting protrusions 54. As shown in FIG. 10A, the woody boards 52 are attached to the key body 51 in a state supported by respective associated ones of the upper convex parts 53 and the lower supporting protrusions 54 such that the woody boards 52 are vertically sandwiched therebetween.

Further, the key body 51 has a front end thereof formed with front convex parts 55 that protrude in the lateral direction of the key body 51. The front convex parts 55 are formed continuous with a front surface of the key body 51, and extend along a front end of the key body 51. The front convex parts 55 restrict the positions of front ends of the woody boards 52 attached to the key body 51. That is, the front ends of the woody boards 52 are attached to the key body 51 such that they are brought into contact the front convex parts 55 without substantially any gap therebetween.

Further, in the vicinity of rear ends of the side surfaces of the large width portion 51*a*, and in the vicinity of rear ends of the side surfaces of the small width portion 51*b*, there are formed rear supporting protrusions 56 which protrude in the lateral direction of the key body 51 and are opposed to the front convex parts 55. The rear supporting protrusions 56 restrict the positions of rear ends of the respective woody boards 52 attached to the key body 51. That is, the rear ends of the woody boards 52 are partially supported by the rear supporting protrusions 56. The woody boards 52 are supported by the front convex parts 55 and the rear supporting protrusions 56 such that the woody boards 52 are sandwiched therebetween in the front-rear direction as well.

The woody boards 52 are supported by the attachment structures, such as the upper convex parts 53, the lower supporting protrusions 54, the front convex parts 55, and the rear supporting protrusions 56, which are constructed as described above, such that the woody boards 52 are sandwiched therebetween in the vertical direction and the front-rear direction, so that it is possible not only to stably attach the woody boards 52 to the key body 51 but also to prevent gaps from being formed between the key body 51 and the woody boards 52 at the upper end and the front end of the key, which are easy to visually recognize when an adjacent key is depressed, whereby it is possible to create excellent appearance of the sides of the white key 2*a*.

Further, the woody boards 52 are made of a soft wood material with the specific gravity of 0.5 or less, and hence when the woody boards 52 are expanded due to the influence of moisture or the like, the lower supporting protrusions 54 and the rear supporting protrusions 56 can easily bite into the woody boards 52. With this, forces act which press the woody boards 52 against the upper convex parts 53 and the front convex part 55. Therefore, even when the woody boards 52 are expanded, it is possible to prevent gaps from being formed between the woody boards 52 and the upper convex parts 53 or the front convex part 55.

Further, although the whole upper end of each woody board 52 is supported by associated one of the upper convex parts 53 in a state in contact with the same without any gaps therebetween, the lower ends of the woody boards 52 are only partially supported by the lower supporting protrusions 54. With this, when the woody boards 52 are expanded, sufficient space to physically receive expansion of the woody boards 52 are secured below the woody boards 52, and therefore it is possible to prevent deformation, such as warpage or distortion, of the key body 51 from being caused by concentration of stress on the key body 51 due to the expansion of the woody boards 52.

Furthermore, to more firmly attach the woody boards 52 to the key body 51, the woody boards 52 and the key body 51 can be bonded to each other with an adhesive. When the adhesive is used, if extra adhesive leaks out from gaps between the woody boards 52 and the upper end or the front end of the key body 51 and sticks and solidifies, the extra adhesive can cause interference with the adjacent key or spoil the appearance of the white key 2*a*. In the present embodiment, however, since extra adhesive can flow out into space below the woody boards 52, there is no fear that the extra adhesive having leaked out interferes with the adjacent key. Further, since portions below the woody boards 52 are not exposed outside by depression of the adjacent key, the appearance of the white key 2*a* is not spoiled by the adhesive having leaked out below the woody boards 52.

Note that in the present embodiment, the white key 2*a* is configured such that one woody board 52 is supported by a plurality of lower supporting protrusions 54, and with this configuration, the lower end of the woody board 52 is more stably supported. This more effectively prevents a gap from being formed between the key body 51 and the woody board 52 in the vicinity of the upper end of the woody board 52. Further, also when the woody board 52 is expanded, the plurality of lower supporting protrusions 54 more stably press the woody board 52 against the upper convex part 53 while biting into the lower end of the woody board 52, thereby more effectively preventing a gap from being formed between the upper convex part 53 and the woody board 52. On the other hand, as a more simplified configuration of the white key 2*a*, the white key 2*a* may be configured such that a lower end of one woody board 52 is supported by one lower supporting protrusion 54. In this case as well, it is possible to prevent a gap from being formed between the upper convex part 53 and the woody board 52.

Figure 10B:
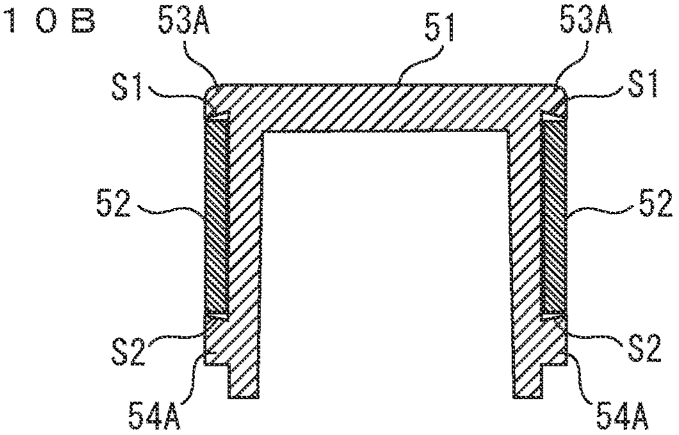

FIG. 10B shows a variation of the upper convex parts 53 and the lower supporting protrusions 54. As shown in FIG. 10B, each upper convex part 53A is different from the above-described upper convex part 53 only in that a surface thereof, which is opposed to a lower supporting protrusion 54A, is formed as a sloped surface S1 which is sloped downward toward a lower end of an associated side of the key body 51 such that the opposed surface of the upper convex part 53A protrudes downward as it extends toward a tip end side (toward a side remote from the side surface of the key body 51). Similarly, the lower supporting protrusion 54A is different from the above-described lower supporting protrusion 54 only in that a surface thereof, which is opposed to the upper convex part 53A, is formed as a sloped surface S2 which is sloped upward toward an upper end of the side surface of the key body 51 such that the opposed surface of the lower supporting protrusion 54A protrudes upward as it extends toward a tip end side (toward a side remote from the side surface of the key body 51). As described above, the upper convex part 53A and the lower supporting protrusion 54A have the sloped surfaces S1 and S2, respectively, so that when the woody board 52 is expanded, a portion of the woody board 52, which is in contact with the upper convex part 53A or the lower supporting protrusion 54A, is guided by the sloped surface S1 or S2 associated therewith, whereby the woody board 52 is expanded such that the portion of the woody board 52 slides into a base end side (side closer to the side surface of the key body 51) of the upper convex part 53A or the lower supporting, protrusion 54A. With this, even when the woody board 52 is expanded, the key body 51 and the woody board 52 are brought into more intimate contact with each other, thereby making a cap difficult to be formed, and the upper end of the woody board 52 is made difficult to be moved away from the key body 51, which makes it possible to prevent the appearance of the white key 2*a* from being spoiled by deformation of the woody board 52.

Further, although not shown, similarly, the front convex parts 55 and the rear supporting protrusions 56 as well can be configured such that the front convex parts 55 each have a sloped surface which is formed by sloping a surface thereof opposed to the rear supporting protrusion 56, toward the rear end side, such that the opposed surface thereof protrudes rearward as it extends toward a tip end side (toward a side remote from the side surface of the key body 51), and the rear supporting protrusions 56 each have a sloped surface which is formed by sloping a surface thereof opposed to the front convex part 55, toward the front end side, such that the opposed surface thereof protrudes forward as it extends toward a tip end side (toward a side remote from the side surface of the key body 51). As described above, by forming the sloped surfaces on the front convex parts 55 and the rear supporting protrusions 56, respectively, when the woody boards 52 are expanded, portions of the woody boards 52, which are in contact with the front convex part 55 or the rear supporting protrusion 56, are guided by the sloped surfaces, whereby the woody boards expanded such that the portions of the woody boards 52 slide into base end sides (sides closer to the side surfaces of the key body 51) of the front convex parts 55 or the rear supporting protrusions 56. With this, the key body 51 and the woody boards 52 move into more intimate contact with each other, thereby making gaps more difficult to be generated, and the front ends of the woody boards 52 becomes difficult to be moved away from the key body 51, which makes it possible to more effectively prevent the appearance of the white key 2*a* from being spoiled by deformation of the woody boards 52.

Figure 11:
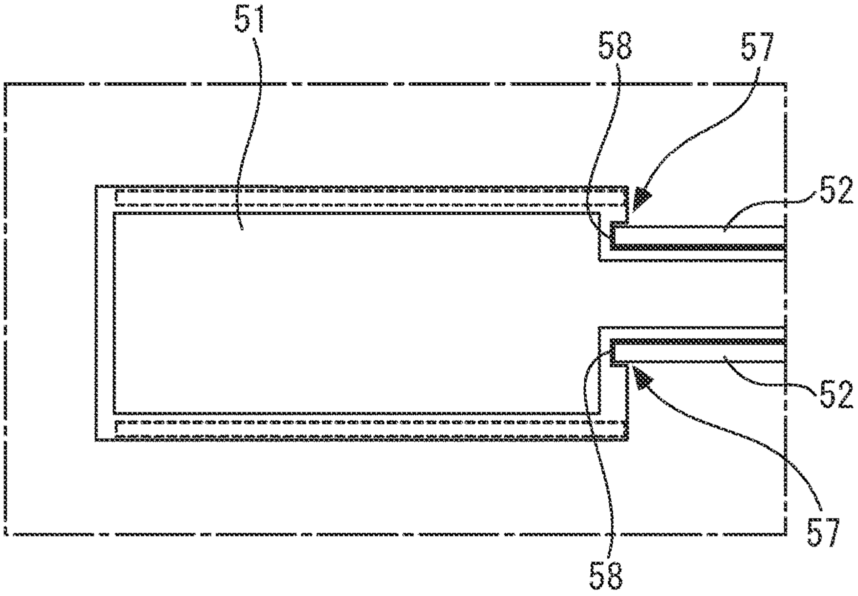
FIG. 11 is a cross-sectional view taken along line C-C of FIG. 9A.

FIG. 11 is a cross-sectional view taken along line C-C of FIG. 9A. As shown in FIG. 11, corner parts 57, which are formed at boundaries between the large width portion 51*a* and the small width portion 51*b* of the key body 51, are each provided with a groove 58 for receiving the front end of the woody board 52 associated therewith. In each corner part 57, the groove 58 is formed as a recess provided in a rear end surface of the large width portion 51*a*, and a vertical length and a lateral width of the groove 58 are set to values slightly larger than respective values of a vertical length and a lateral width of the front end of the woody board 52 attached to the small width portion 51*b*, and hence when the woody board 52 is attached, the front end of the woody board 52 can be easily inserted into the groove 58. With the construction described above, when the woody boards 52 are attached to the key body 51, the front ends of the woody boards 52 attached to the small width portion 51*b* are received in the grooves 58, whereby it is possible not only to improve adhesiveness of the key body 51 and the woody boards 52 at the boundaries between the large width portion 51*a* and the small width portion 51*b* but also to improve the appearance of the white key 2*a* since no gap is formed between the front ends of the woody boards 52 and the key body 51, when viewed from the side.

Note that the present invention is not limited to the above-described embodiment, but it can be practiced in a variety of forms. For example, although in the above-described embodiment, the description has been given of the configuration in which the woody boards are not only vertically sandwiched by the upper convex parts and the lower supporting protrusions but also sandwiched in the front-rear direction by the front convex part and the rear supporting protrusions, it is also possible to employ a configuration in which the front convex part and the rear supporting protrusions are not provided but the woody boards are supported only by the upper convex parts and the lower supporting protrusions.

Further, although in the above-described embodiment, the description has been given of the configuration in which the upper convex parts and the lower supporting protrusions have the sloped surfaces, respectively, and the configuration in which the front convex parts and the rear supporting protrusions have the sloped surfaces, respectively, it is also possible to employ a configuration in which only one of each upper convex part and each lower supporting protrusion or only one of each front convex part and each rear supporting protrusion have a sloped surface. In this case as well, it is, possible not only to make gaps difficult to be formed by bringing the key body and the woody boards into more intimate contact with each other but also to prevent the appearance of the white key from being spoiled by deformation of the woody boards.

Further, although in the above-described embodiment, the woody boards having relatively large areas are attached to the side surfaces of the large width portion and the small width portion of the key body, it is also possible to achieve reduction of manufacturing costs by attaching the woody boards only to portions visually recognized during depression of adjacent keys. It is to be further understood that a variety of changes and modifications may be made without departing from the spirit and scope of the invention.

What is claimed is:

1. A key for a keyboard device, including a key body made of resin, which has at least an upper surface and a side surface and extends a predetermined length in a front-rear direction, and at least one woody board attached along at least part of the side surface of the key body, wherein the key body comprises:

an upper convex part extending along an upper end of the side surface and formed continuous with the upper surface, the upper convex part protruding in a lateral direction of the key body, and a lower supporting protrusion disposed in the vicinity of a central portion or a lower end of the side surface, the lower supporting protrusion protruding in the lateral direction of the key body and opposed to the upper convex part, wherein the at least one woody board is sandwiched by having its upper end supported by the upper convex part and its lower end partially supported by the lower supporting protrusion.

2. The key for a keyboard device according to claim 1, wherein the key body further comprises:

a front convex part extending along a front end of the side surface and protruding in the lateral direction of the key body, and a rear supporting protrusion disposed in the vicinity of the central portion or a rear end of the side surface, the rear supporting protrusion protruding in the lateral direction of the key body and opposed to the front convex part, and wherein the at least one woody board is sandwiched by the front convex part and the rear supporting protrusion.

3. The key for a keyboard device according to claim 1, wherein the key body includes a plurality of the lower supporting protrusions.

4. The key for a keyboard device according to claim 1, wherein the upper convex part has a surface opposed to the lower supporting protrusion, the surface being sloped toward the lower end of the side surface such that the surface protrudes downward as the surface extends toward a tip end of the upper convex part, and wherein the lower supporting protrusion has a surface opposed to the upper convex part, the surface being sloped toward the upper end of the side surface such that the surface protrudes upward as the surface extends toward a tip end of the lower supporting protrusion.

5. The key for a keyboard device according to claim 2, wherein the front convex part has a surface opposed to the rear supporting protrusion, the surface being sloped toward the rear end of the side surface such that the surface protrudes rearward as the surface extends toward a tip end of the front convex part, and wherein the rear supporting protrusion has a surface opposed to the front convex part, the surface being sloped toward the front end of the side surface such that the surface protrudes forward as the surface extends toward a tip end of the rear supporting protrusion.

6. The key for a keyboard device according to claim 1, wherein the key body is made for a white key and includes a large width portion extending a predetermined length in the front-rear direction and adjacent only to a white key, and a small width portion extending a predetermined length in the front-rear direction and adjacent to a black key, and wherein a groove for receiving a front end of the at least one woody board is formed in a corner part formed at a boundary between the large width portion and the small width portion.

7. The key for a keyboard device according to claim 1, wherein the at least one woody board is a soft wood material with a specific gravity of 0.5 or less.

* * * * *